Patented Oct. 4, 1932

1,880,225

UNITED STATES PATENT OFFICE

DANIEL ZINNER, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

AZO DYESTUFF AND A PROCESS OF PREPARATION

No Drawing.    Application filed July 2, 1928. Serial No. 290,044.

This invention relates to azo dyestuffs and to a process of preparing the same. The dyes of this invention dye wool in greenish yellowish tints to reddish orange tints characterized by their great fastness to light and milling.

It is an object of this invention to provide a method of making azo dyestuffs which dye wool in greenish yellow shades to reddish orange shades characterized by their excellent fastness properties to light and milling.

These azo dyestuffs have probably the following chemical composition:

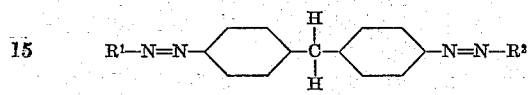

wherein $R^1$ and $R^2$ are pyrazolone groups. The tetrazo components employed are prepared from 4.4'-diamino-diphenyl-methanes which may be prepared from an amine and formaldehyde in an acid solution by the use of ½ mole of formaldehyde to 1 mole of amine. See method of German Patent No. 70,402 or German Patent No. 53,937. They are not the so called anhydro bases prepared by the use of 1 mole of the amine to 1 mole of formaldehyde as in German Patents 83,544, 93,540, 95,600, 96,851 and 96,852. These diamines may be represented by the following formula:

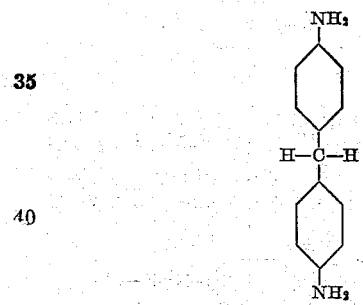

It is assumed that the methane linkage in these compounds is para to the amino group. The hydrogens in the benzene nuclei may be substituted in the above formula to some extent by other groups as for example, alkyl, halogen, alkoxy, sulfonic acid groups and the like.

The groups $R^1$ and $R^2$ are 3-substituted 5 pyrazolone groups and may be the same or different. The hydrogens on the aromatic ring of the pyrazolone may be similarly substituted to some extent by other groups as for example, methyl, halogen, methoxy, sulfonic acid and the like. In order to give the dyestuff proper solubility in the dyebath, it is necessary that its molecules have at least one acid group therein, as for example, $SO_3H$.

Without limiting my invention to any particular procedure, the following example, in which parts by weight are given, will serve to illustrate my method in its preferred form.

*Example*

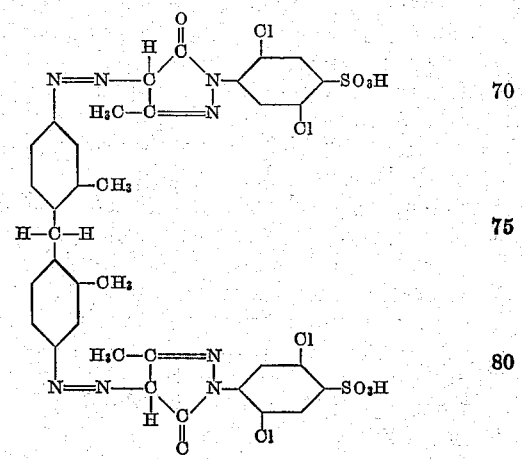

22.6 parts of 4,4'-diamino-2,2'-dimethyl diphenyl methane base are tetrazotized in the usual manner with 58 parts of hydrochloric acid, 20° Bé., and 13.8 parts of sodium nitrite. The resulting tetrazo solution is run into a cooled solution containing 66 parts of 1- ortho-meta-dichloro-para-sulfo-phenyl-3-methyl-5-pyrazolone rendered alkaline with sodium carbonate. After stirring for a short time, common salt to about a 20% solution is added and the mixture heated to about 80° C. The solution is cooled somewhat and the separated dyestuff filtered off, washed with a little brine and dried. The product after drying is a yellow powder which dyes wool in an acid or neutral bath yellow shades remarkably fast to light and milling.

Other diamino diphenyl methanes may be employed in a similar manner, as for example, 4.4'-diamino-3.3'-dimethyl-diphenyl methane, 4.4'-diamino-2.2'-dichloro-diphenyl-methane, 4.4'-diamino-2.3, 2',3'-tetrachloro diphenyl methane, the methyl or ethyl ethers of these bases or their sulfonic acids. By a variation of the use of the various diamino bodies the shades may be varied to some extent from greenish yellow to reddish orange. Of all these, however, the diamino-diphenyl-methane bodies, substituted only in the 2-2'-position, and particularly, the 2-2'-dimethyl derivative, are to be preferred, as they give colors which are substantially greener in shade and have greater tinctorial value than those of the 3-3'-disubstituted-diamino-diphenyl-methanes.

Other pyrazolones may be similarly used as the coupling component, as for example, phenyl-methyl-pyrazolone, its sulfonic acid or its substitution products. By varying the pyrazolone used with 4.4'-diamino-2,2'-dimethyl-diphenyl methane the shade similarly may be varied from greenish yellow to reddish yellow. The combinations of varying the amine and varying the pyrazolone may be used to produce a large variety of shades from greenish yellow to reddish orange. Of all these combinations, however, those involving the 1-(2'-5'-dichloro-4'-sulfo-)-phenyl-3-methyl-5-pyrazolone produce colors having the greenest shades and greatest tinctorial power, and are to be preferred.

In the claims below, it should be understood that where new products, dyestuffs, or articles of manufacture are claimed, I mean to include these bodies not only in substance but also in whatever state they may exist when applied to material dyed, printed or pigmented therewith.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing azo dyestuffs, which comprises coupling a 1-(2'-5'-dichloro-p'-sulfo-)-phenyl-5-pyrazolone body with a tetrazotized 4-4'-diamino-diphenyl-methane body.

2. As new articles of manufacture, azo dyestuffs of the following general formula:

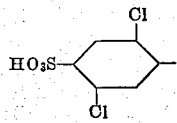 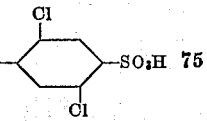

where R stands for a 5-pyrazolone body and X represents a member of the group consisting of hydrogen, alkyl, alkoxy, halogen and sulfonic acid groups.

3. The process of preparing azo-dyestuffs, which comprises coupling a pyrazolone body to tetrazotized 4-4'-diamino-2-2'-dimethyl-diphenyl methane having no other substituents.

4. As new articles of manufacture, azo dyestuffs having the following general formula:

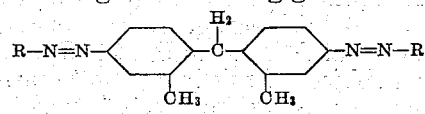

where R stands for an aryl-pyrazolone residue, the entire dyestuff having at least one acid group in the molecule.

5. The process of preparing azo dyestuffs, which comprises coupling 1-(2'-5'-dichloro-p'-sulfo-)-phenyl-3-methyl-5-pyrazolone to tetrazotized 4-4'-diamino-2-2'-dimethyl-diphenyl methane.

6. As a new product of manufacture, an azo dyestuff having most probably the following structural formula:

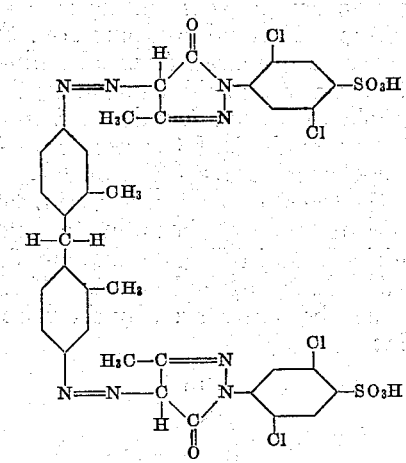

7. The process of preparing azo dyestuffs which comprises coupling 1-(2'-5'-dichloro-p'-sulfo-)-phenyl-3-methyl-5-pyrazolone with a tetrazotized body of the following formula:

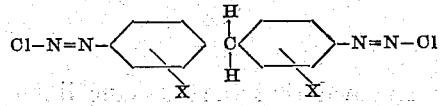

in which the X's stand for the same or different substituents of the class consisting of hydrogen, alkyl, alkoxy, halogen and sulfonic acid.

8. As new articles of manufacture, azo dyestuffs of the following general formula:

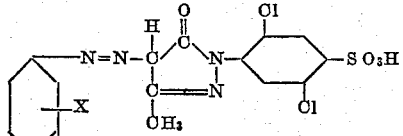

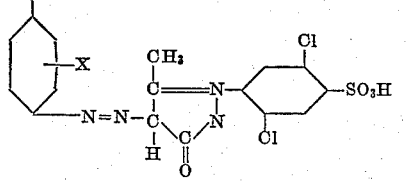

in which the X's stand for the same or different substituents of the class consisting of hydrogen, alkyl, alkoxy, halogen and sulfonic acid.

9. The process of preparing azo dyestuffs which comprises coupling a pyrazolone body to a tetrazotized diphenyl methane body having the following structure:

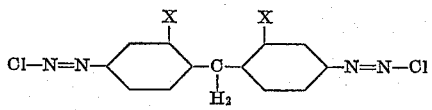

in which X stands for hydrogen, alkyl, alkoxy, halogen or a sulfonic acid group.

10. As new articles of manufacture, azo dyestuffs having the following formula:

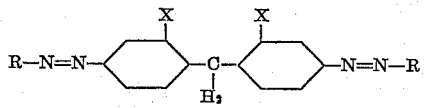

wherein R stands for an arylpyrazolone residue and X represents a member of the group consisting of hydrogen, alkyl, alkoxy, halogen, and sulfonic acid groups, the entire dyestuff having at least one acid group in the molecule.

In testimony whereof I have hereunto subscribed my name at Carrollville, Milwaukee county, Wisconsin.

DANIEL ZINNER.